Nov. 2, 1965
H. E. CLOYD
3,215,998
PLURAL CENTRAL AND REMOTE STATION SIGNALLING AND INTERCOMMUNICATION SYSTEM
Filed May 5, 1960
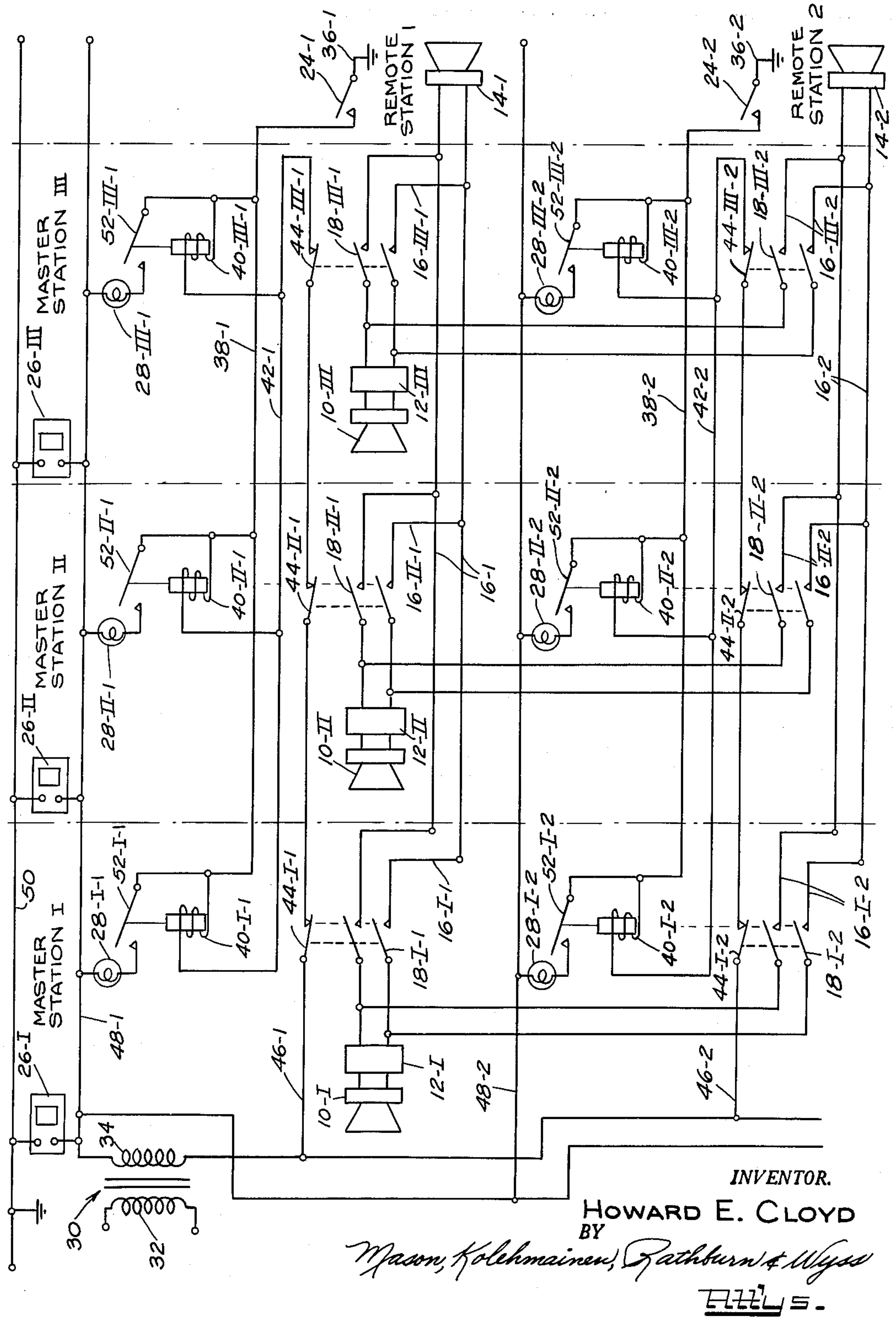
INVENTOR.
HOWARD E. CLOYD
BY
Mason, Kolehmainen, Rathburn & Wyss
Attys.

3,215,998
Patented Nov. 2, 1965

3,215,998

PLURAL CENTRAL AND REMOTE STATION SIGNALLING AND INTERCOMMUNICATION SYSTEM

Howard E. Cloyd, Lebanon, Ky., assignor to Webster Electric Company, Racine, Wis., a corporation of Delaware Filed May 5, 1960, Ser. No. 27,063
4 Claims. (Cl. 340—286)

The present invention relates to an intercommunication system and has for its primary object a new and improved signalling circuit for same.

The signalling circuit of the present invention is particularly adapted for intercommunication systems of a type including a dispatch center at which are located a number of adjacent master stations adapted selectively to communicate with a plurality of outlying remote stations. The master stations are provided with audible and visual signalling means adapted to be energized from each of the remote stations. The arrangement is such that when a remote station signals or calls the dispatch center the audible signals at each master station are briefly operated and the visual signals are operated until such time as a communication circuit to the calling station is established by operation of a selector switch corresponding to the calling station at any of the plurality of master stations.

Accordingly, it is an object of the present invention to provide a new and improved intercommunication system comprising a plurality of centrally located master stations and a plurality of outlying remote stations wherein the operation of signalling or calling means at any outlying station operates audible and visual signalling means at all the master stations and in which the visual signalling means remains operated until one of the master stations responds to the call from the outlying remote station.

In brief, the intercommunication system of the present invention includes a plurality of master stations each having a single audible signalling means such as a buzzer and visual signalling means such as a signal lamp for each of the outlying remote stations. Each of the outlying remote stations include a signalling or calling switch adapted to be closed temporarily to operate the buzzer and to energize a relay at each master station adapted to establish a holding circuit for itself and to complete an energizing circuit to the signal lamp. The arrangement is thus such that when the signalling switch at the remote station is operated the buzzer sounds at each of the master stations. All the relays at the master stations corresponding to the remote station are operated to energize all the signalling lights and to maintain them energized after release of the signalling switch. The holding circuit for the relay includes a switch at each master station operable conjointly with a station selector switch thereat corresponding to the calling station. The holding circuit is thus adapted to be broken whenever a selector switch is operated to establish communication between any of the plurality of master stations and a calling remote station. Once communication has been established between any master station and any remote station, other remote stations may call the other master stations.

Other objects and advantages of the present invention will become apparent from the ensuing description of an illustrative embodiment thereof, in the course of which reference is had to the accompanying drawing, the single figure of which is a schematic diagram of an intercommunication system constructed in accordance with the present invention.

Referring now to the drawing, it will be noted that there are three master stations labeled as such and indicated by reference characters I, II and III. These stations may be and generally are located closely adjacent each other as at a central dispatch center. There are also a plurality of remote stations labeled as such and indicated by the reference characters 1 and 2. It should be understood that there may be more of each type of station.

Each of the master stations has a translating device 10 used both as a transmitter and a receiver. At this point it should perhaps be mentioned that in view of the similarity of the components at the various stations the components will be indicated by like reference characters but with the suffix –I, –II and –III depending on the master station at which the component is located. Each of the master stations is provided with amplifier and communication direction control switch means of conventional type and indicated by the reference character 12.

The remote stations, which may be located at remote outlying points, each has a combined receiver-transmitter indicated by the reference characters 14–1 and 14–2. The receiver 14–1 is connected by the communication circuit 16–1 to each of the master stations, there being branch circuits 16–I–1, 16–II–1 and 16–III–1 leading to the respective master stations. Each of the master stations also includes a station selector switch 18 (individually indicated as 18–I–1, 18–II–1 and 18–III–1) for establishing a communication circuit between the translating device 10 at the master station with the remote station 14–1. There is a communication circuit 16–2 leading from remote station 2 to the master stations through the branch circuits 16–I–2, 16–II–2 and 16–III–2, as shown. The master stations are also provided with the station selector switches 18–I–2, 18–II–2 and 18–III–2 for selection of remote station 2 for communication.

The combined amplifier and communication direction switch means 12 at each of the stations, as already indicated, may be of conventional construction. They may also be of a type wherein the communication direction switches are not necessary or two way communication systems of the type using a separate receiver and transmitter at each station may be used.

In accordance with the present invention the intercommunication system is provided with signalling means whereby any remote station can simultaneously call all the master stations. This means includes a signalling or calling switch 24–1 at remote station 1 and 24–2 at remote station 2. To call from remote station 1, for example, the switch 24–1 thereat is operated to complete a circuit to operate the audible and visual signalling means at the master stations. The audible signal means for all remote stations are the buzzers 26–I, 26–II and 26–III and the visual signalling means for remote station 1 are the signalling lamps 28–I–1, 28–II–1 and 28–III–1.

The buzzers are energized for a suitable power source such as a transformer 30 having a primary winding 32 and a secondary winding 34. When the switch 24–1 is closed, the buzzers are all connected across the secondary winding through a circuit extending from a ground connection 36–1 at station 1, the switch 24–1 in its closed position, the conductor 38–1, relay windings 40–I–1, 40–II–1 and 40–III–1 all connected in parallel, conductor 42–1, the normally closed relay holding circuit switches 44–I–1, 44–II–1 and 44–III–1 at the respective master stations, conductor 46–1 leading to the secondary winding 34, the conductor 48–1 leading to all the buzzers and the conductor 50 which is connected to ground. Thus, the buzzers at all stations are connected across the transformer and operated when the switch 24–1 is closed.

When the switch 24–I is closed, the relay windings 40–I, 40–II and 40–III are all initially energized as indicated above and operate to close energizing circuits for the signalling lamps 28–I–1, 28–II–1 and 28–III–1 through relay operated switches 52–I–1, 52–II–1 and 52–III–1. These switches connect the relay windings 40 in parallel across the secondary winding 34 through conductors 48–1, 38–1, 42–1 and 46–1. The arrangement is thus such that when the switches 52 are closed the relays remain energized after the switch 24–1 is opened and the buzzers cease to sound.

It is apparent, therefore, that when remote station 1 calls the master stations the buzzers sound at all the master stations and the signal lights corresponding to remote station 1 will light at all the master stations.

When any one of the three master stations responds to the call from remote station 1, the signal lights 28 at all the master stations are extinguished. This is accomplished by connecting the switches 44 in the holding circuit of all the relays to the station selector switches 18 so that when a station selector switch corresponding to the calling station is operated at any of the master stations then, not only is the communication circuit established between the calling remote and master stations, but the relay holding circuit is broken.

The apparatus and circuitry at the master stations for remote station 2 is like that already described above in connection with station 1 and, as indicated above, it is indicated by like reference characters with the suffix –2.

Reviewing now the operation of the system, it is assumed first that there is no communication taking place. Accordingly, either of the remote stations may call the master stations by operating the signal switch 24 thereat. When the switch is operated the signal lights 28 corresponding to the calling station are energized and maintained energized by the relays 40. The buzzers 26 at all the stations sound as long as the switch 24 is closed.

Thus, all the master stations are signalled that a remote station is calling. Thereafter any master station can respond to the call by operating the selector switch 18 corresponding to the calling station. When this is done the holding circuit for the relays is broken and the signalling means returns to inoperative condition.

When remote station 1 is in communication with say master station I, the other remote stations, such as remote station 2, can call the central station. This is done by closure of switch 24–2 at remote station 2 whereby the buzzers at all the master stations are operated as are the relays 40–I–2, 40–II–2 and 40–III–2 with resulting operations at the master stations corresponding to those described above in connection with a call originating from station 1.

While there have been illustrated and described several embodiments of the present invention, it will be apparent to those skilled in the art that various changes and modifications may be made without departing from the invention in its broader aspects, and it is, therefore, contemplated in the appended claims to cover all such changes and modifications as fall within the true spirit and scope of the present invention.

What is claimed as new and desired to be secured by Letters Patent of the United States is:

1. A signalling circuit for a communication system comprising a plurality of master stations and a plurality of outlying remote stations, audible and visual signal means for each remote station at each master station, calling means at each remote station, station selector switch means at each master station corresponding to each remote station, and means including circuits and control means associated with said calling means and station selector switch means controlling said audible and visual signal means for simultaneously operating said visual and audible signalling means when said calling means is operated and maintaining said visual signalling means operated until said station selector switch means corresponding to the calling remote station is operated at any master station.

2. A signalling circuit for a communication system comprising a dispatch center including a number of master stations and a plurality of outlying remote stations, buzzer means at each master station, signal lights at each master station for each of the plurality of outlying remote stations, relay means at each of the master stations for each of the signal lights thereat and effective when operated to energize a signal light, station selector switches at each master station for each of the remote stations for establishing communication circuits between them, means including a signalling switch at each remote station operable from a normally open to a closed position for completing an energizing circuit for the buzzer means and the relays corresponding to the remote station at all the master stations, energizing circuits controlled by said relays for establishing holding circuits for the relays to maintain them energized upon opening of the signal switches, and normally closed switches in the holding circuits each controlled by a corresponding station selector switch and operable to open position upon operation of a station selector switch to select a calling remote station.

3. A signalling circuit for a communication system comprising a dispatch center including a number of master stations and a plurality of outlying remote stations, audible signal means at each master station, visual signal means at each master station for each of the plurality of outlying remote stations, relay means at each of the master stations for each of the visual signal means thereat and effective when operated to operate a signal means, station selector means at each master station for each of the remote stations for establishing communication circuits between them, means including signalling means at each remote station operable from a normal position to an actuated position for completing circuits to the audible signal means and the relays corresponding to the remote station at all the master stations, energizing circuits controlled by said relays for establishing holding circuits for the relays to maintain them energized upon opening of the signalling means, and normally closed switches in the holding circuits each controlled by a corresponding station selector means and operable to open position upon operation of a station selector means to select a calling remote station.

4. A signalling circuit for a communication system comprising a plurality of outlying remote substations, a dispatch center including a number of master stations, buzzer means at each master station, signal lights at each master station for each of the plurality of outlying remote stations, relay means at each of the master stations for each of the signal lights thereat and effective when operated to energize a signal light, means including a signalling switch at each remote station operable from a normally open to a closed position for completing an energizing circuit for the relays corresponding to the remote station at all the master stations, energizing circuits controlled by said relays for establishing holding circuits for the relays to maintain them energized upon opening of the signal switches, buzzer control circuit means for energizing said buzzer means at each master station in response to closing of a signalling switch at any of said remote stations, and switch means at each master station for each of the plurality of outlying remote substations including station selector switch blade means operable from a normally open to a closed position for establishing a communication circuit between a master station and a substation, and normally closed holding circuit switch blade means in said holding circuits corresponding to the substation adapted to operate simultaneously with said station selector switch blade means to disconnect said holding circuits and extinguish the signal lights at each master station corresponding to the substation.

References Cited by the Examiner

UNITED STATES PATENTS

| | | | |
|---|---|---|---|
| 1,609,395 | 12/26 | Bailey | 179—58 |
| 2,111,237 | 3/38 | Brack | 340—286 |
| 2,168,805 | 8/39 | Pelikan | 340—326 |
| 2,263,157 | 11/41 | Auth | 340—286 |
| 2,489,213 | 11/49 | Addorisio | 340—286 |
| 2,917,581 | 4/57 | MacFarlane et al. | 179—1 |
| 2,912,685 | 11/59 | Thomas | 340—326 |
| 2,942,249 | 6/60 | Paull | 340—326 |

NEIL C. READ, *Primary Examiner.*

EVERETT R. REYNOLDS, *Examiner.*